(12) United States Patent
Granger et al.

(10) Patent No.: US 10,800,116 B2
(45) Date of Patent: Oct. 13, 2020

(54) MOULDING MATERIAL AND METHOD OF FORMING SAME

(71) Applicant: Hexcel Composites SAS, Dagneux (FR)

(72) Inventors: Denis Granger, Dagneux (FR); Jeanne Clouteau, Dagneux (FR)

(73) Assignee: HEXCEL COMPOSITES SAS, Dagneux (FR)

( * ) Notice: Subject to any disclaimer, the term of this patent is extended or adjusted under 35 U.S.C. 154(b) by 270 days.

(21) Appl. No.: 15/502,515

(22) PCT Filed: Aug. 24, 2015

(86) PCT No.: PCT/EP2015/069380
§ 371 (c)(1),
(2) Date: Feb. 8, 2017

(87) PCT Pub. No.: WO2016/034451
PCT Pub. Date: Mar. 10, 2016

(65) Prior Publication Data
US 2017/0225411 A1    Aug. 10, 2017

(30) Foreign Application Priority Data
Sep. 1, 2014    (EP) .................................... 14183087

(51) Int. Cl.
*B29C 70/54*    (2006.01)
*B29C 70/50*    (2006.01)
*B29B 13/04*    (2006.01)
*B29C 35/16*    (2006.01)

(52) U.S. Cl.
CPC ............ *B29C 70/545* (2013.01); *B29B 13/04* (2013.01); *B29C 35/16* (2013.01); *B29C 70/50* (2013.01); *B29C 70/54* (2013.01)

(58) Field of Classification Search
CPC ....... B29C 70/545; B29C 70/54; B29C 70/50; B29C 35/16; B29B 13/04
See application file for complete search history.

(56) References Cited

U.S. PATENT DOCUMENTS 3,931,491 A * 1/1976 Stumpf .................. B23K 26/40
219/121.67
4,002,877 A * 1/1977 Banas .................. B23K 26/146
219/121.72
(Continued)

FOREIGN PATENT DOCUMENTS

FR    2721250 A1    12/1995
GB    2298377 B    3/1997
(Continued)

OTHER PUBLICATIONS

Johnson, W.S., Pavlick, M., M.S. Oliver, Determination of Interlaminar Toughness of IM7/977-2 Composites at Temperature Extremes and Different Thicknesses, Final Report, NASA Grant No. NAG-1-02003, (May 2005), 27 pages. (Year: 2005).*
(Continued)

*Primary Examiner* — Matthew J Daniels
(74) *Attorney, Agent, or Firm* — W. Mark Bielawski

(57) ABSTRACT

A method of separating a composite material stack comprising multiple elements (12) in contact with one another is discloses. Each element (12) comprises reinforcement fibers and an uncured resin matrix, and the method comprises the steps of temperature treating the stack and/or applying a stress to the stack to separate the elements.

7 Claims, 1 Drawing Sheet

(56) References Cited

U.S. PATENT DOCUMENTS

| | | | | |
|---|---|---|---|---|
| 4,639,572 | A | * | 1/1987 | Gruzman ............ B23K 26/0846 219/121.67 |
| 4,683,018 | A | * | 7/1987 | Sutcliffe ................. B29C 33/68 156/196 |
| 4,908,494 | A | * | 3/1990 | Faiz ....................... B23K 26/40 219/121.72 |
| 5,647,544 | A | | 7/1997 | Greiner et al. |
| 8,298,359 | B2 | * | 10/2012 | Inserra Imparato .. B29C 70/504 156/94 |

FOREIGN PATENT DOCUMENTS

| | | |
|---|---|---|
| JP | H09-994476 A | 4/1997 |
| JP | 2002-212320 A | 7/2002 |
| JP | 2003-277532 A | 10/2003 |
| JP | 2010-214704 A | 9/2010 |
| JP | 2015-000897 A | 1/2015 |
| WO | 1999/055507 A | 11/1999 |
| WO | 2002/042548 A2 | 5/2002 |

OTHER PUBLICATIONS

Ray, B.C., Effects of Thermal and Cryogenic Conditionings on Mechanical Behavior of Thermally Shocked Glass Fiber—Epoxy Composites, Journal of Reinforced Plastics and Composites, vol. 24, No. 7 (2005), pp. 713-717. (Year: 2005).*
FR2721250 A1—English Translation.
Office Action issued in corresponding Japanese Application No. 2017-511851, dated Jul. 9, 2019.

* cited by examiner

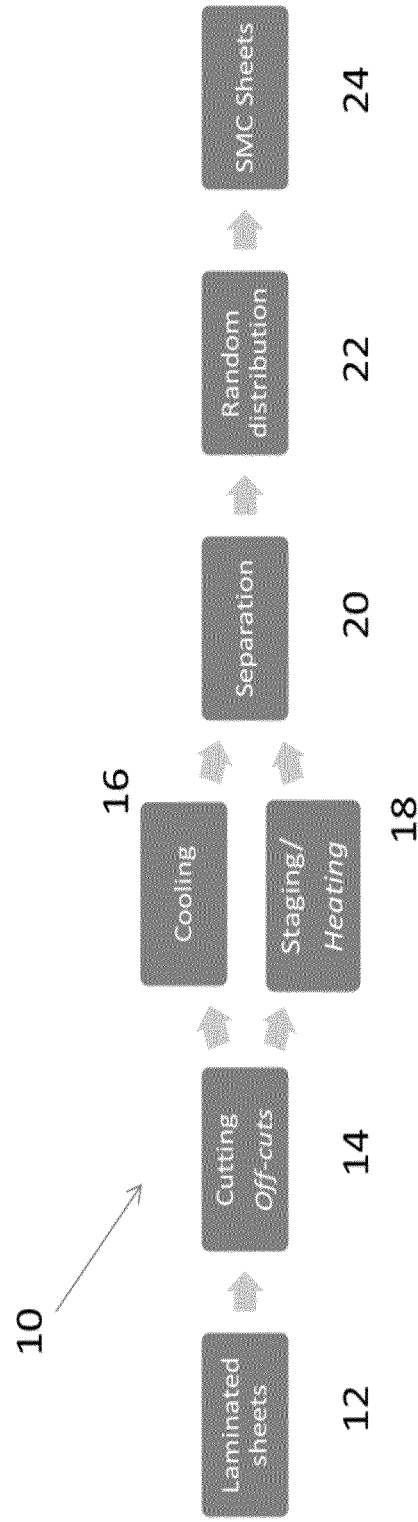

MOULDING MATERIAL AND METHOD OF FORMING SAME

The present invention relates to a method of separating a composite material, and a separated composite material, moulding and composite element, particularly but not exclusively to a method of separating a composite material stack.

BACKGROUND

Composites comprising fibre reinforced materials and in particular prepregs comprising fibres and thermosetting resins may be stacked to form preforms. These preforms are subsequently cured to form a reinforced composite material. Such composite materials are known, they are lightweight and of high strength and are used in many structural applications such as in the automobile and aerospace industries and in industrial applications such as wind turbine components such as spars and the shells used to make the blades.

Prepreg is the term used to describe fibres and fabric impregnated with a resin in the uncured state and ready for curing. The fibres may be in the form of tows or fabrics. The tows or fabrics generally comprise a plurality of thin fibres called filaments. The selection of fibrous materials and resins employed in the prepregs depends upon the properties required of the cured composite material and also the use to which the composite is to be put.

Various methods have been proposed for the production of prepregs, one of the preferred methods being the impregnation of a moving fibrous web with a liquid, molten or semi-solid uncured thermosetting resin. The prepreg produced by this method is then be cut into sections of desired dimensions and a stack of the sections is cured by heating to produce the final fibre reinforced laminate. Curing may be performed in a vacuum bag which may be placed in a mould for curing as is preferred in the manufacture of wind energy structures such as shells for the blades and spars. Alternatively, the stack may be formed by compression in a closed mould and cured directly in the mould by heating (compression moulding).

One preferred family of resins for use in such applications are curable epoxy resins and curing agents and curing agent accelerators are usually included in the resin to shorten the cure cycle time. Epoxy resins are highly suitable resins although they can be brittle after cure causing the final laminate to crack or fracture upon impact and it is therefore common practice to include toughening materials such as thermoplastics or rubbers in the epoxy resin.

The prepreg can be in the form of an integral layer of reinforcement material or it can be in the form of elements oriented in random directions to form a quasi-isotropic material layer. Multiple prepreg layers or elements are conventionally combined to form composite laminate structures. The prepreg layers may be arranged in parallel, randomly in an in plane direction (quasi-isotropic) or as isotropic or quasi-isotropic prepreg elements.

Following formation of the laminate, it may be cut. This produces off-cuts. However, utilization of off-cuts for other purposes poses a problem as the configuration of the laminate is tailored to a particular purpose or application. To increase the opportunities for re-use, separation of the laminate into multiple prepreg layers or elements is desirable. Also, separation of laminate preforms is desirable in general to allow preforms to be reworked or re-used.

The present invention aims to obviate and/or mitigate the above described problems, and/or to provide improvements generally.

SUMMARY OF THE INVENTION

According to the present invention, there is provided a method, a moulding, and a moulding compound and and an element as defined in any one of the accompanying claims.

In an embodiment of the invention, there is provided a method of separating a composite material stack comprising multiple elements in contact with one another, each element comprising reinforcement fibers and a resin matrix, wherein the method comprises the steps of temperature treating the stack and applying a stress to the stack to separate the elements.

The combination of temperature treatment and applied stress or force to the stack results in the separation of the combined elements and/or individual elements. The combined elements may be subjected to further temperature treatment and/or stress to further separate the combined elements into individual elements or combined elements.

The stress may be selected from one or more of the following stresses:
 a. Flexural stress
 b. Torsional stress
 c. Compression stress
 d. Shear stress
 e. Peel stress,
 f. Tensile stress, and
 g. Vibrational stress.

In an embodiment, flexural stress is the application of a stress which allows the elements to bend in relation to one another. Torsional stress is a stress which allows the elements to rotate in relation to one another. Compression stress is a stress which allows the elements to be compressed in relation to one another. Shear stress is a stress which allows the elements to slide or shear in relation to one another. Peel stress is a stress which allows the elements to unpeel in relation to one another. Tensile stress is a stress which allows the elements to be extended in relation to one another. Vibrational stress is subjecting the elements to a vibration.

In a preferred embodiment, the applied stress comprises a combination of two or more of the above listed stresses a to g. The stress may be applied in one or more directions in relation to the stack, to an individual element, to combined elements and/or to combinations thereof. This allows the elements to be separated successfully.

The elements are preferably arranged parallel to one another to form a laminate stack. Stresses a to f are preferably applied in a direction perpendicular to the laminate stack. In this way the stress is exerted perpendicular to the combined and/or individual elements. The vibrational stress g is preferably applied in a direction parallel to the laminate or combined and/or individual elements.

The elements may comprise reinforcement fibers and an uncured resin matrix. The fibers are preferably preimpregnated with the matrix to form a prepreg.

Preferably, the stresses are applied consecutively, simultaneously or cyclically.

In a further embodiment, the temperature treatment and stress application occur at least partially simultaneously. They may also be applied consecutively and/or in a cyclical manner, of one or more cycles of temperature treatment and/or stress application. The cycles may be repeated until the elements are separated.

Preferably, stress application follows temperature treatment. We have found that this provides a successful way of separating the elements.

In a further embodiment, the temperature treatment increases or decreases the Tg (glass transition temperature) of the resin matrix by heating or cooling the matrix respectively. We have found that application of the stresses a to g for at a reduced temperature of from −80 to 10° C., preferably from −60 to 7° C., −40 to 5° C., −30 to 3° C., −20 to 0° C. and/or combinations of the aforesaid temperatures increases their efficacy in separating combined and/or individual elements. The reduced temperature decreases the Tg of the resin matrix.

In another embodiment, the temperature treatment comprises cooling the resin matrix to a temperature in the range of from −30 to 10° C., or −20 to 5° C., or −10 to 0° C., or −5 to 0° C. and/or combinations of the aforesaid temperatures. Cooling of the matrix has the effect of reducing the resin matrix tack. We have found that this also increases the efficacy of separation.

The resin matrix may be cooled to reduce the tack of the resin to a value which is less than 40%, or less than 30%, or less than 20%, or less than 10% or preferably less than 5% of the tack value of the resin at room temperature. The tack value or tack of a resin is a measure of the adhesion of the resin to a tool surface or to other prepreg plies in an assembly. Tack may be measured in relation to the resin itself or in relation to the prepreg in accordance with the method as disclosed in "Experimental analysis of prepreg tack", Dubois et al, (LaMI)UBP/IFMA, 5 Mar. 2009. This publication discloses that tack can be measured objectively and repeatably by using the equipment as described therein and by measuring the maximum debonding force for a probe which is brought in contact with the resin or prepreg at an initial pressure of 30 N at a constant temperature of 30° C. and which is subsequently displaced at a rate of 5 mm/min. For these probe contact parameters, the tack F/Fref for the resin is in the range of from 0.1 to 0.6 where Fref=28.19 N and F is the maximum debonding force. For a prepreg, the tack F/Fref is in the range of from 0.1 to 0.45 for F/Fref where Fref=28.19 N and F is the maximum debonding force.

In another embodiment, the temperature treatment comprises heating of the resin matrix. Heating has the effect of reducing the viscosity of the resin matrix.

The resin matrix may be heated to reduce the viscosity of the resin to a value is which less than 60%, preferably less than 45% of the tack value of the resin at room temperature (20° C.).

Temperature treatment and/or the application of stresses may be conducted simultaneously, partially simultaneously, subsequently, or cyclically during which the temperature and/or applied stresses may be varied. Temperature treatment and/or stress application may be continued until the elements are separated.

In another embodiment, the stack is formed from an uncured moulding or laminate of layers of fibrous reinforcement material preimpregnated with resin matrix (prepreg) and/or a moulding formed from resin impregnated chopped reinforcement fibers and/or combinations thereof. The element may comprise a prepreg.

In a further embodiment, there is provided a composite element, each element comprising reinforcement fibers and a resin matrix, said elements formed from a stack of conjoined elements following temperature treatment and stress application to separate the elements.

The stack may be formed following cutting of a moulding or laminate of layers of fibrous reinforcement material preimpregnated with resin matrix (prepreg) and/or a moulding formed from resin impregnated chopped reinforcement fibers and/or combinations thereof.

In an embodiment, the moulding may comprise multiple elements, each element comprising reinforcement fibers and a resin matrix, said elements formed by separating a stack in accordance with any of the methods as hereinbefore described.

The stack may be cut into smaller stacks before separation of into multiple elements. Alternatively, or additionally, the separated elements may be cut into smaller elements following their separation.

DETAILED DESCRIPTION

The invention will now be described by way of example only and with reference to the following drawing in which:

FIG. 1 shows a diagrammatic view of a process for separating a laminate product according to an embodiment of the present invention.

Laminate lay-ups can be formed from combined layers of fibrous reinforcement which are impregnated with a resin matrix. Preferably, the fibrous reinforcement layers comprise unidirectional fiber tows and the layers are arranged in relation to one another to form a quasi-isotropic lay-up. Preferably, the layers are extending in the +90/+45/0/−45/−90 directions and they may be arranged in multiples thereof.

These lay-ups may be (die) cut into laminate parts which are subsequently processed as compression mouldings. The cutting process results in redundant laminate lay-up material. This redundant material may be usable for another purpose and the present invention seeks to address this as well as to provide improvements generally.

FIG. 1 presents a re-use process 10. Offcuts 12 from die cut laminated prepreg sheets are cut into smaller laminate elements 14 or they may be cut following completion of the process 10. These elements are temperature treated 16,18 by either heating or cooling or by a combination of both temperature treatments. Heating 18 decreases the viscosity of the resin, and increases Tg and can aid separation, whereas cooling reduces the Tg and/or tack of the resin matrix allowing layers to be more easily separated.

Following temperature treatment, the elements are separated by the application of stress 20. The stress may be applied in different directions and/or forms in relation to the laminate elements. Steps 20, 16 and 18 may be combined or conducted partially simultaneously or cyclically until the elements are separated. Following separation 20, randomly distributed single layer prepreg elements 22 are combined together into a sheet form as a sheet moulding compound (SMC) 24. This SMC is then suitable for re-use to produce composite parts.

There is thus provided a method and a moulding compound as hereinbefore described.

The invention claimed is:

1. A method of forming a sheet moulding compound, comprising the steps of:
(a) as a first step, cutting a moulding or laminate of layers of fibrous reinforcement material impregnated with resin matrix to produce a plurality of off-cuts, said off-cuts each being, in the form of uncured composite material stacks comprising multiple uncured elements in contact with one another, each uncured element comprising reinforcement fibers and a resin matrix;
(b) thereafter, as a second step, separating, each of said uncured composite material stacks into its constituent elements by at least partially simultaneously temperature treating the uncured composite material stacks and applying at least one stress to the uncured composite material stacks to separate the uncured elements from each other, wherein the at least one applied stress is a stress selected from the group consisting of flexural stress, torsional stress, compression stress, shear stress, peel stress, tensile stress and vibrational stress;

(c) randomly distributing the uncured elements and combining to form a sheet moulding compound.

2. The method of claim 1, wherein the at least one stress is applied in one or more directions in relation to the stack.

3. The method of claim 1, wherein more than one stress is applied consecutively or simultaneously.

4. The method of claim 1, wherein temperature treatment comprises cooling the resin matrix.

5. The method of claim 4, wherein the resin matrix is cooled to reduce the tack of the resin to a value which is less than 10% of the tack value of the resin at room temperature.

6. The method of claim 1, wherein the temperature treatment comprises heating of the resin matrix.

7. The method of claim 1, wherein stress application and temperature treatment are cycled or repeated.

* * * * *